United States Patent

Zimmermann

[15] 3,671,043

[45] June 20, 1972

[54] DEVICE FOR POSITIONING A MAGNETIC HEAD TO A SELECTED TRACK OF A MULTI-TRACK RECORDING TAPE

[72] Inventor: Joseph James Zimmermann, Elm Grove, Wis.

[73] Assignee: GTE Automatic Electric Laboratories Incorporated, Northlake, Ill.

[22] Filed: June 4, 1970

[21] Appl. No.: 43,462

[52] U.S. Cl. ....................274/4 A
[51] Int. Cl. ....................G11b 5/56
[58] Field of Search....................274/4 A, 11 A; 179/100.2 CA

[56] References Cited

UNITED STATES PATENTS

| | | | |
|---|---|---|---|
| 3,372,937 | 3/1968 | Flint | 274/11 A |
| 3,420,965 | 1/1969 | Townsend et al. | 274/11 A |
| 3,445,116 | 5/1969 | Knox | 274/4 A |

*Primary Examiner*—Harry N. Haroian
*Attorney*—K. Mullerheim, B. E. Franz and David W. Heid

[57] ABSTRACT

A device for positioning a magnetic head to a selected track of a multi-track recording tape, wherein a rotatable follower plate is controlled by a plurality of mechanically interlocking push buttons, each having an individual different length actuator bar, with the amount of angular rotation of the follower plate being predetermined in accordance with the length of each actuator bar. The interlocking arrangement of the push buttons is so arranged that each last-operated push button unlocks the previously operated push button and thereafter locks itself operated. In the device, a cam is attached to the end of the shaft of the follower plate, with the cam surface engaged by a follower arm attached to the magnetic head, whereby operation of any push button simultaneously causes a specific deflection of the follower plate and a correspondingly specific rotation of the cam to enable the follower arm to raise or lower the magnetic head to the track on the tape corresponding to the operated push button.

6 Claims, 3 Drawing Figures

INVENTOR
JOSEPH JAMES ZIMMERMANN

BY James T. Whitesel
AGENT

DEVICE FOR POSITIONING A MAGNETIC HEAD TO A SELECTED TRACK OF A MULTI-TRACK RECORDING TAPE

BACKGROUND OF THE INVENTION

1. Field

This invention relates in general to cartridge type multi-track tape recording and reproducing machines, and more particularly to a push button controlled device for positioning a magnetic tape head to a selected track on the tape in accordance with the last-operated push button.

2. Prior Art

Many prior art cartridge type multi-track recording and reproducing machines use a cam and cam-follower arrangement for positioning the magnetic tape head with respect to the tracks on the tape. In general, the arrangement includes a cam having a plurality of graduated different cam surfaces, each of which is associated with a different track on the tape. A solenoid is used to drive a pawl which is coupled to a ratchet for moving the different cam surfaces into contact with the cam-follower to thereby position the tape head. With this arrangement, certain of the cam surfaces when in contact with the cam follower cause an autorotation of the cam, thereby resulting in a misalignment of the tape head with the associated tracks. This arrangement also generally required that the cam be varied in elevation in order that each of its surfaces were indexed with the associated tracks on the tape, thus causing the problem of maintaining the pawl in engagement with the ratchet, since the ratchet was coupled to the cam and moved with it during the indexing.

SUMMARY OF THE INVENTION

A primary object of the present invention is the provision of an improved device for positioning a tape head with respect to the tracks of cartridge type multi-track magnetic tapes, wherein the device is simple in construction, economical to manufacture, accurate and reliable in operation and requires a minimum of maintenance.

In the achievement of the above-mentioned object, there is provided in a preferred embodiment of the invention, an assembly, or bank, of conventionally designed mechanically interlocking push buttons, each having a different length actuator bar, mounted within a frame and comprising a central structure. A shaft, having a motion translating follower plate attached thereto, is rotatably mounted at the rear of the central structure in such a position that the follower plate is operatively controlled by the actuator bar associated with any one of the push buttons, when operated. The follower plate is continuously biased into engagement with the end of the actuator bar individual to each last-operated push button.

A cam is rigidly attached to one end of the follower plate shaft and rotates therewith, responsive to any one of the push buttons being operated to cause a deflection of the follower plate and a consequent rotation of the shaft.

The tape head is slidably mounted within the enclosing top sides of a stand, which is secured by its feet to the frame at a position straddling the follower shaft and adjacent the cam. A follower arm is permanently attached at one end to the bottom of the tape head and is so arranged that its other end is biased into sliding engagement with the cam surface during all positions of rotation of the cam.

The tape cartridge, using a tape having a plurality of tracks, is mounted on the top frame, or mounting board, and is arranged in such a manner that the tape is guided to move longitudinally across the face of the head during all operations of the machine.

When a push button associated with a desired track on the tape is depressed, a number of nearly simultaneous operations take place, namely: any previously operated push button is unlocked and restores; the follower plate is engaged by the end of the actuator bar of the operated push button and is moved an amount determined in accordance with the length of the actuator bar, whereby the shaft of the follower plate is rotated in accordance with the movement of the follower plate; the operated push button is locked in its operated position; the cam attached to the one end of the shaft of the follower plate is rotated therewith; and, the follower arm engaging the cam surface raises or lowers the tape head to the desired track on the tape, as selected in accordance with the operated push button.

DESCRIPTION OF THE DRAWINGS

The nature of the invention and its distinguishing features and advantages, which reside in the construction and the arrangement and combination of parts, will be more clearly understood from the following detailed description taken in conjunction with the accompanying drawings, wherein.

DETAILED DESCRIPTION

Structure

Figure 1:
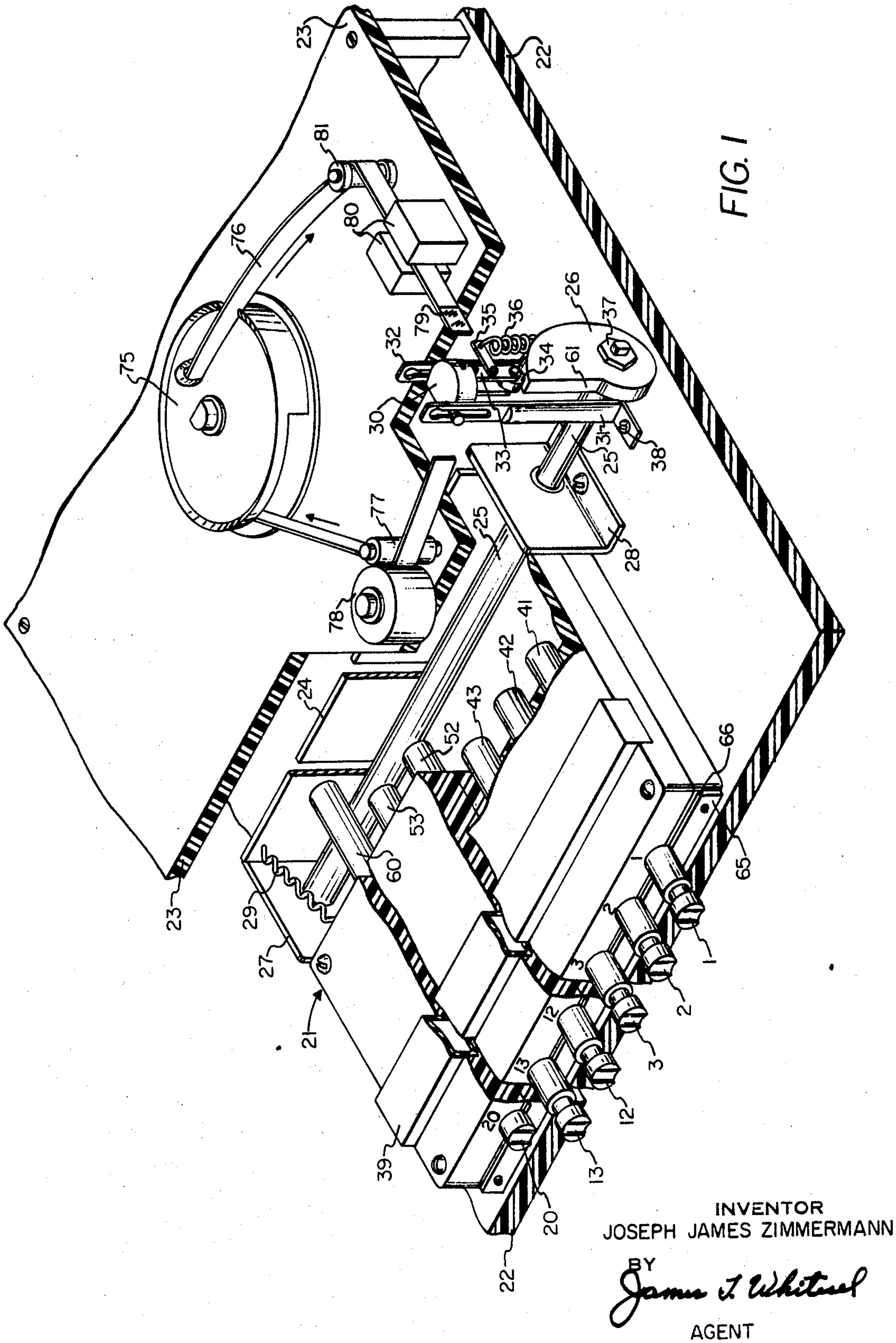
FIG. 1 is a partial sectionalized isometric view of the head positioning device.

Referring to the drawings, and in particular to FIG. 1, the tape head positioning device essentially comprises a push button bank 21 mounted on the lower frame mounting board 22, with bank 21 consisting of a plurality of mechanically interlocking spring-biased push buttons 1 through 20. Each of the push buttons 1 through 20 have an individual different length actuator bar 41 through 60, respectively, associated therewith.

It is pointed out that the push button interlocking arrangement 39 is assumed to comprise any well-known device wherein the last-operated push button is locked operated, and a subsequently operated push button controls the device to unlock the previously operated push button and allow its biasing arrangement to restore it to normal. This last-operated push button thereafter locks itself operated in its maximum forward longitudinal movement.

A follower plate shaft 25 is rotatably mounted by means of brackets 27 and 28 to mounting board 22, with shaft 25 being located directly in front of and immediately below the actuator bars 41 through 60. A rectangular-shaped and somewhat lengthwise follower plate 24 is attached along its lower edge to shaft 25. The right end of shaft 25 extends through and to the right of bracket 28 for a predetermined distance, with cam 26 being rigidly attached to the end thereof by means of nut 37. Cam 26 is shown as being flat and substantially one-half of a heart-shaped type, wherein its working face, or flank, is of a constantly varying radius from its mounting point, or hole. It will be appreciated, however, that a full heart-shaped type cam could also be used in the positioning device. It is pointed out that before cam 26 is permanently attached to shaft 25, the attached follower plate 24 must first be properly positioned.

Referring in particular to FIG. 1, follower plate 24 is rotated to its maximum forward, or clockwise, position as shown, by depressing the highest numbered push button 20. Since its individual actuator bar 60 is of a greater length than the other actuator bars, follower plate 24 is therefore rotated to the above-mentioned desired position of maximum movement. Bias spring 29 is utilized for maintaining follower plate 24 in engagement with the end of the actuator bar associated with the last-operated push button, whereby counter clockwise rotation of plate 24 is provided. Cam 26 is thereafter rigidly attached to the right-hand end of shaft 25, with side edge 61 positioned so that it is parallel with the front engaging surface of follower plate 24 as shown in FIG. 2.

Tape head 30 is slidably mounted in slots provided in the upper portions of legs 31 and 32, which are positioned straddling shaft 25 at a point adjacent the inner side of cam 26 and are secured by their respective feet to board 22. The upper end of follower arm 33 is attached to head 30, with the lower end of arm 33 provided with a cam follower roller 34, which is continuously biased against the working face of cam 26 by means of spring 36.

Tape cartridge 75 is mounted on the upper frame mounting board 23 and contains the endless loop of magnetic tape 76, which extends from cartridge 75, around guide roller 81, between the sections of photocell and lamp assembly 80, across the face of head 30, between capstan 77 and pressure roller 78 and back to cartridge 75. A transparent section 79 is spliced into tape 76 to provide later-described operating control functions.

Figure 2:
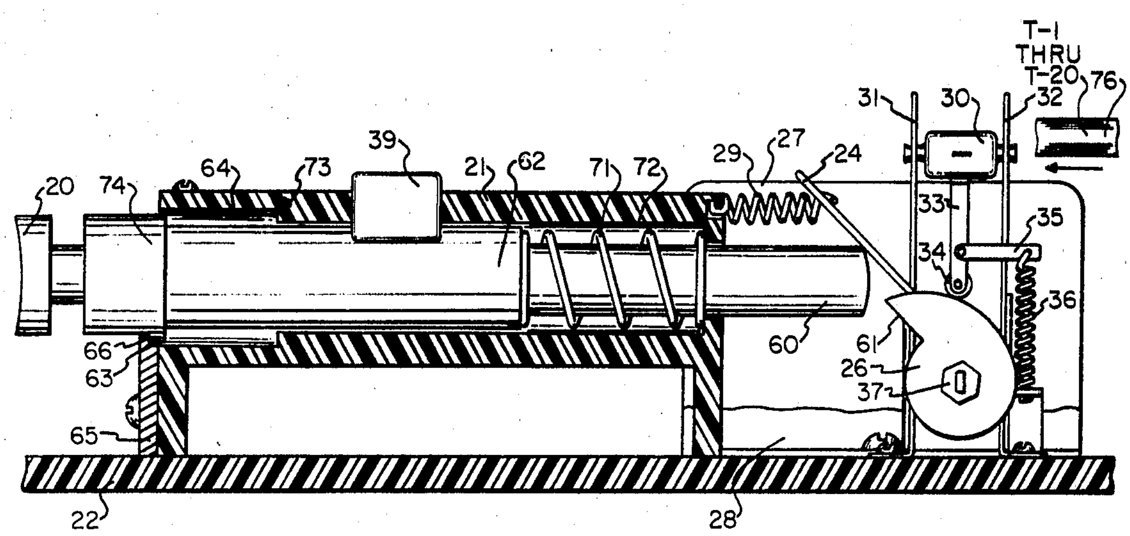
FIG. 2 is a side view, partly in cross section, of the head positioning device showing a particular one of the push buttons in an inoperated condition.
Figure 3:
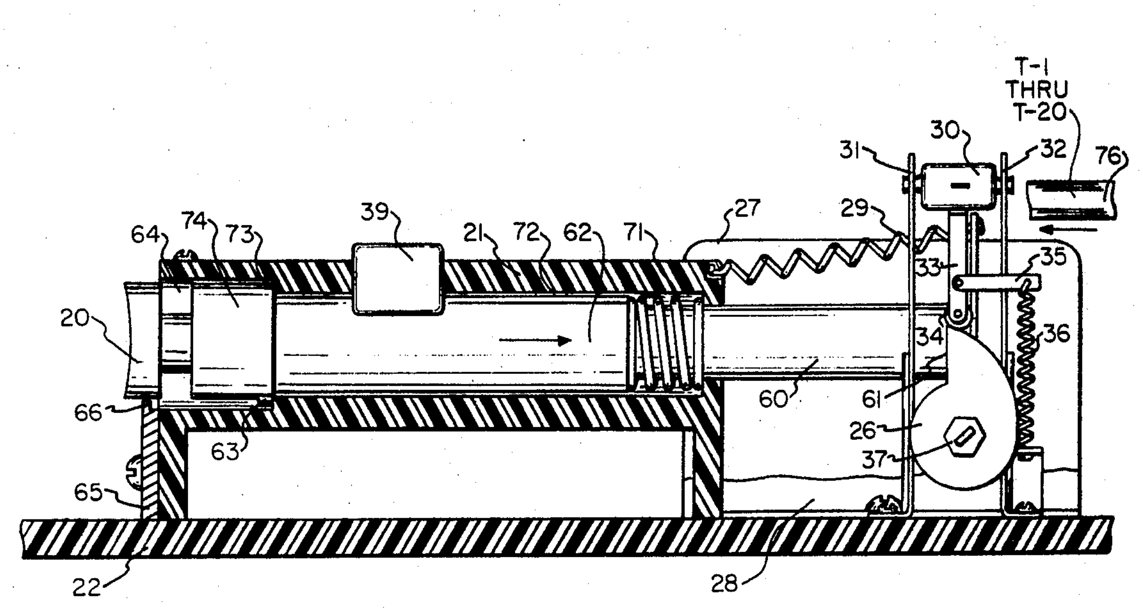
FIG. 3 is a side view, partly in cross section, of the head positioning device showing the push button of FIG. 2 in an operated condition.

The structure and assembly of the push buttons, as shown in FIGS. 2 and 3 will now be described, with it being pointed out that all of the push buttons are of identical construction and arrangement, with the exception of the different length actuator bars individual thereto. As shown, push button 20 comprises a main body 62 slidably mounted within the cylinder 72 formed in bank 21, with actuator bar 60 being attached to the inner end of body 62. The outer end of main body 62 comprises an enlarged end portion 74, which is limited to movement within enlarged cylinder portion 64 formed in cylinder 72. In order to more clearly show the arrangement of the follower plate, shaft and actuator bars, end mounting bracket 28 is shown as being partially cut away in FIGS. 2 and 3. As shown in FIG. 3, edge 73 of the enlarged cylinder portion 64 acts as a stop to limit the inward movement of push button 20, by engaging the leading edge of end portion 64. A biasing spring 71 is mounted encircling actuator bar 60, with one end of the spring engaging edges of the frame structure of bank 21 and the other end engaging the end sides of the push button main body 62 for continuously biasing the entire assembly of push button 20 to the left toward its normal inoperative position. Lip 63 is formed in the lower surface of enlarged end portion 74 for engaging finger 66 of plate 65, which is attached to the lower front edge of bank 21. In this manner a stop is provided for the assembly of push button 20 so that the biasing action of spring 71 establishes its normal inoperative position. Plate 65 thereby maintains all the push buttons within this mounting.

OPERATION

Before beginning the operation description of the positioning device, it is thought best to point out that due to the specific nature of the invention, such known apparatus as motors, relays, operating and controlling circuitry and other electrical elements, which are all normally essential to tape recording and reproducing machines, have been omitted from the disclosure. However, in order to intelligently describe the operation of the positioning device, it will be assumed that the device is incorporated into a tape recording and reproducing machine including the above-mentioned known apparatus. It is also pointed out that while only one magnetic tape head is disclosed, it may be of the type that, in accordance with a selected function, it will erase a previously recorded message or data, simultaneous with the recording of new information, or it will function only to playback the recorded message, or data.

In describing the operation of the positioning device, it will be first assumed that push button 1 has been depressed and is locked by locking mechanism 39 in its maximum forward direction of longitudinal movement. Responsive to the operation of push button 1, the position of follower plate 24, cam 26, follower arm 33 and its associated roller 34 and tape head 30 is similar to that such as shown in the right-hand portion of FIG. 2. The recording, or playback, face of head 30 is thereby aligned with the first track T–1 on magnetic tape 76. Although not shown, it will be appreciated that with push button 1 operated, follower plate 24 is biased into simultaneous engagement with the ends of actuator bars 41 and 60 of push buttons 1 and 20, respectively. However, if any push button other than push button 1 is operated, the actuator bar individual to only that operated push button will be engaged by follower plate 24.

In response to the operation of push button 1, a starting circuit (not shown) for energizing the drive motor (not shown) of the machine is completed in any well-known manner, whereby tape 76 is pulled from cartridge 75, across head 30 and back into cartride 75 as shown in the direction of the arrows, with head 30 functioning in accordance with a predetermined manual selection. The above operation continues until transparent section 79 reappears from cartridge 75 and passes into the photocell and lamp assembly 80 for operating the photocell to open the motor operating circuit and thereby stop the machine after one complete cycle of operation.

It will now be assumed that the last track T–20 on magnetic tape 76 will hereafter be selected, wherein push button 20 is operated to perform the selection of this track.

Referring in particular to FIGS. 2 and 3, it will be seen that as push button 20 is depressed in the direction of the arrow, the end of actuator bar 60 engages follower plate 24 and moves it to the right, thereby simultaneously rotating shaft 25 and cam 26 in a clockwise direction until push button 20 is locked by locking mechanism 39 in its maximum forward direction of movement. At the time that locking mechanism 39 is operated to lock push button 20 operated, it also unlocks push button 1, which is restored to normal by its biasing spring similar to 71. Roller 34 of follower arm 33 follows the working face of cam 26 as cam 26 is rotated in the clockwise direction, thereby moving head 30 upward until the rotation of cam 26 stops as a result of push button 20 reaching its maximum forward movement. At this time, the face of head 30 is aligned with track T–20 of tape 76.

Operation of the machine is initiated as previously described, with the machine thereafter operating in either of the selected record or playback functions, also as described.

From the foregoing it is, therefore, quite evident that an improved tape head positioning device is provided for moving the head to any selected track of a cartridge type multi-track magnetic tape, wherein the device is easy to manufacture and assemble, simple and accurate in operation and requires a minimum of maintenance.

Completely automatic or one step operation could be obtained by actuating a momentary contact switch when any button is fully depressed, that is when the overtravel of the switch lever would actuate a common switch to start the tape recorder. When the switch settles back to the normally operated position, the overtravel switch would be opened, the tape would be passed the photocell actuation point and thus would continue on to complete a cycle of operation.

While a practical application of the invention describes the use of the positioning device, when used with radio or telephone announcement type of machines, it will be appreciated that it is also readily adaptable for use with automatic repertory telephone dialing machines and entertainment type tape recorders and reproducers.

Having described my invention, what is considered new and is desired to have protected by Letters Patent will be pointed out in the appended claims.

What is claimed is:

1. Track selecting apparatus for use with a recording and reproducing machine utilizing a multi-track tape, comprising: a support; a tape head mounted on said support for movement in a direction transverse of said tape; a shaft rotatably mounted on said support, said shaft carrying follower means and having a cam attached to one end thereof; linkage means cooperating with said cam for moving said tape head in said transverse direction; a plurality of interlocking push buttons mounted on said support; a plurality of actuator bars each operatively connected to a corresponding one of said push buttons for longitudinal movement therewith and each having a contact surface normally spaced from said follower means by a different amount, said follower means being engageable by said contact surface such that upon actuation of one of said push buttons said contact surface of the corresponding bar engages said follower means to rotate said shaft and hence said cam to a predetermined angular position thereby a align said tape head with the track corresponding to said actuated push button.

2. Track selecting apparatus adapted for use with recording and reproducing machine utilizing a multi-track tape, comprising: a support; follower means rotably mounted on said support; a bank of push buttons, each of which includes an individual different length actuator bar, and mounted on said support with the ends of said actuator bars operatively engageable with said follower means responsive to the individual operation of their associated said push buttons; a flat cam attached to said follower means and including a working face constantly varying in radius from the center of its point of attachment; a stand mounted on said support adjacent said cam; a tape head slidably mounted within said stand; and linkage means connected to said tape head and operatively engaging said working face of said cam, whereby operation of a selected one of said push buttons accordingly moves its associated actuator bar in a longitudinal direction of movement to engage said follower means for rotating said attached cam an angular amount determined in accordance with the particular length of said associated actuator bar of said one selected push button; said linkage means controlled by said cam rotation for moving said tape head transversely across said tape to a particular track thereon as determined by said amount of said angular rotation of said cam.

3. Track selecting apparatus in accordance with claim 2; wherein said follower means comprises a shaft having a rectangular follower plate attached along one of its longitudinal sides thereto; wherein said plate is operatively engageable by said ends of said actuator bars when their respective said push buttons are operated; and wherein said cam is attached to one end of said shaft.

4. Track selecting apparatus is accordance with claim 3; including means for continuously biasing said follower plate against the actuator bar individual to the last-operated one of said push buttons.

5. Track selecting apparatus in accordance with claim 2; wherein said linkage means comprises a follower arm having one end attached to said tape head and the other end including a roller attached thereto for engaging said working face of said cam.

6. Track selecting apparatus in accordance with claim 5; including means for continuously biasing said roller of said follower arm against said working face of said cam.

* * * * *